INVENTORS.
GEORGE A. PETERS
DOUGLAS W. BRINEY
BY
ATTORNEYS

United States Patent Office 3,454,154
Patented July 8, 1969

3,454,154
INTEGRATED CIRCUIT CARRIER
George A. Peters, La Habra, and Douglas Briney, Yorba Linda, Calif., assignors to the United States of America as represented by the Secretary of the Air Force
Filed May 7, 1968, Ser. No. 727,309
Int. Cl. B65d 83/00
U.S. Cl. 206—56                    6 Claims

ABSTRACT OF THE DISCLOSURE

A cartridge tray for protective handling of critical integrated circuit (I.C.) and transistor elements capable of being packed and transported in standardized containers in nested relationship and clipped together to be inserted and removed from the package as a unit. A special spring element is formed in the underside of each tray, which provides pressure to hold in place the fragile element in the tray below, its leads being thus protected from damage. These stacked units can be inserted in the magazine of automatic and semi-automatic systems, where the critical element is lifted off with a vacuum probe or other means, and deposited in its proper location on the circuit board. The empty wafer or cartridge tray serves as a hold down for the next loaded cartridge, and when it is removed the next tray is stepped up into position. Test probe systems can test a single loaded cartridge, or a stacked unit.

Background of the invention

This invention relates generally to protective packaging of integrated circuit elements, and more particularly to a cartridge tray for protective handling of the circuit elements.

In the past integrated circuit carriers were individually designed by the supplier. The end user, procuring integrated circuits from a variety of suppliers, could not incorporate the carriers into a common automatic or semi-automatic assembly process.

Summary of the invention

The object of the present invention is to provide an established standard I.C. and dual transistor cartridge and cartridge carrier which insures protection of the I.C. elements, and provides proper packaging and handling and further, provides means for accurately locating the element, and, in general, facilitates the automatic and accurate placement of the elements in their proper positions on the circuit boards.

Specifically, the carriers are made of uniform dimensions, having a cut corner, or other deformation conforming in a complementary manner to a similar deformation of the package and later the magazine to insure uniform orientation. They are provided also with oppositely disposed indentations to accommodate an elongated wire clip which holds a series of stacked elements together. A retaining spring secures the unit.

At the users' plant, the system acts as a cartridge feed for automated placement equipment. The carrier stack is inserted into an indexing feed mechanism which steps the loaded carriers up to a precision locating point where a vacuum probe lifts the I.C. or other element out of the carrier and automatically places it on the circuit board within the required close tolerances. The empty carrier is ejected as the next loaded carrier is stepped up into position.

The carrier may be injection molded, using "Lexan" polycarbonate thermoplastic material, or any other material found to be suitable for the purposes. Polycarbonate has good electrical properties and high heat resistance. It also provides the properties required when the device is used as a testing holder in combination with commercially available multiprobe heads.

The cartridge has many means for protecting the fragile critical elements. The elements are cradled on a saddle located in a central recess, and individual smaller recesses are provided for the individual leads.

The carrier is designed to accept variations in element sizes and those which have precut and preformed leads.

The individual element carriers are thus nested and inserted as a composite unit into a package and later into an automated magazine chute. The arrangement allows a step-up system to advance the magazine upward in such a manner that the end cartridge or I.C. carrier is accurately positioned for a vacuum pick-up head or similar device for placing the element accurately in its position on the circuit board. The end or top cartridge operates as a hold down for the cartridge located directly below. The critical elements are thus held within a protective package, rather than being subjected to the risk of damage by individual handling.

Description of the preferred embodiments

Figure 1:
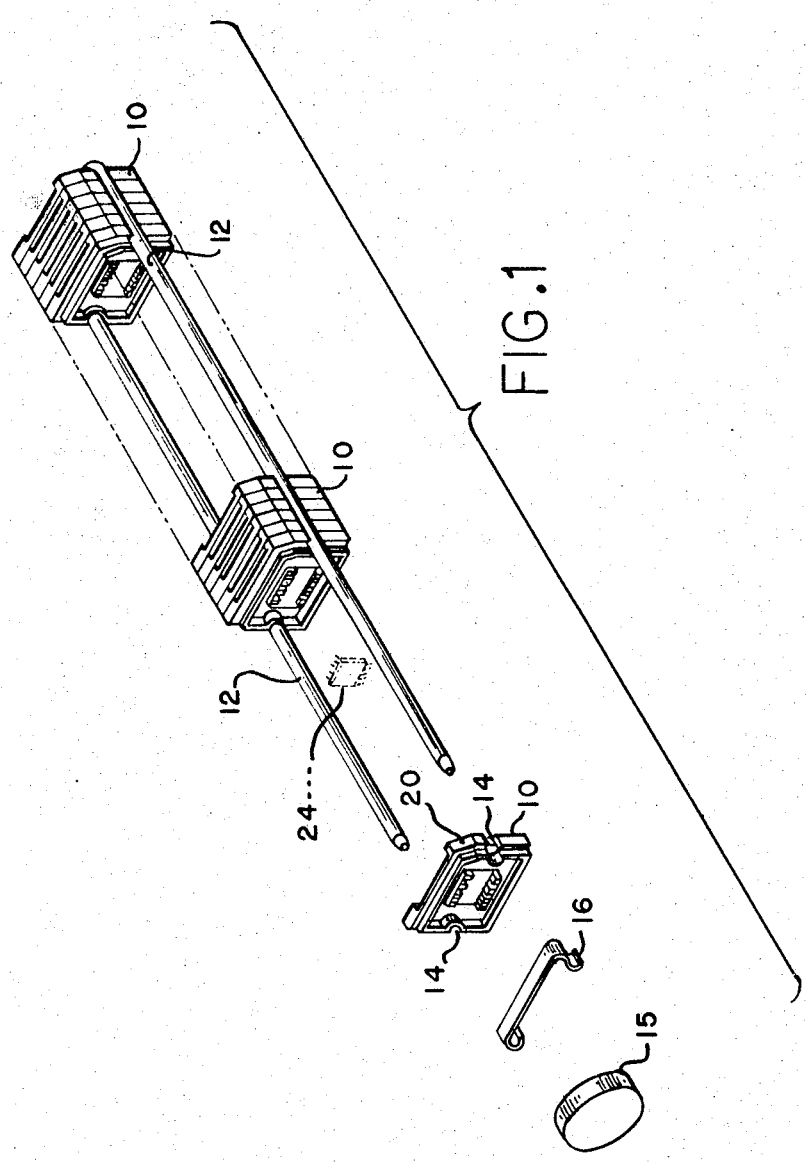
FIGURE 1 illustrates in an exploded view a series of nested cartridges, showing the retaining clip and spring.
Figure 2:
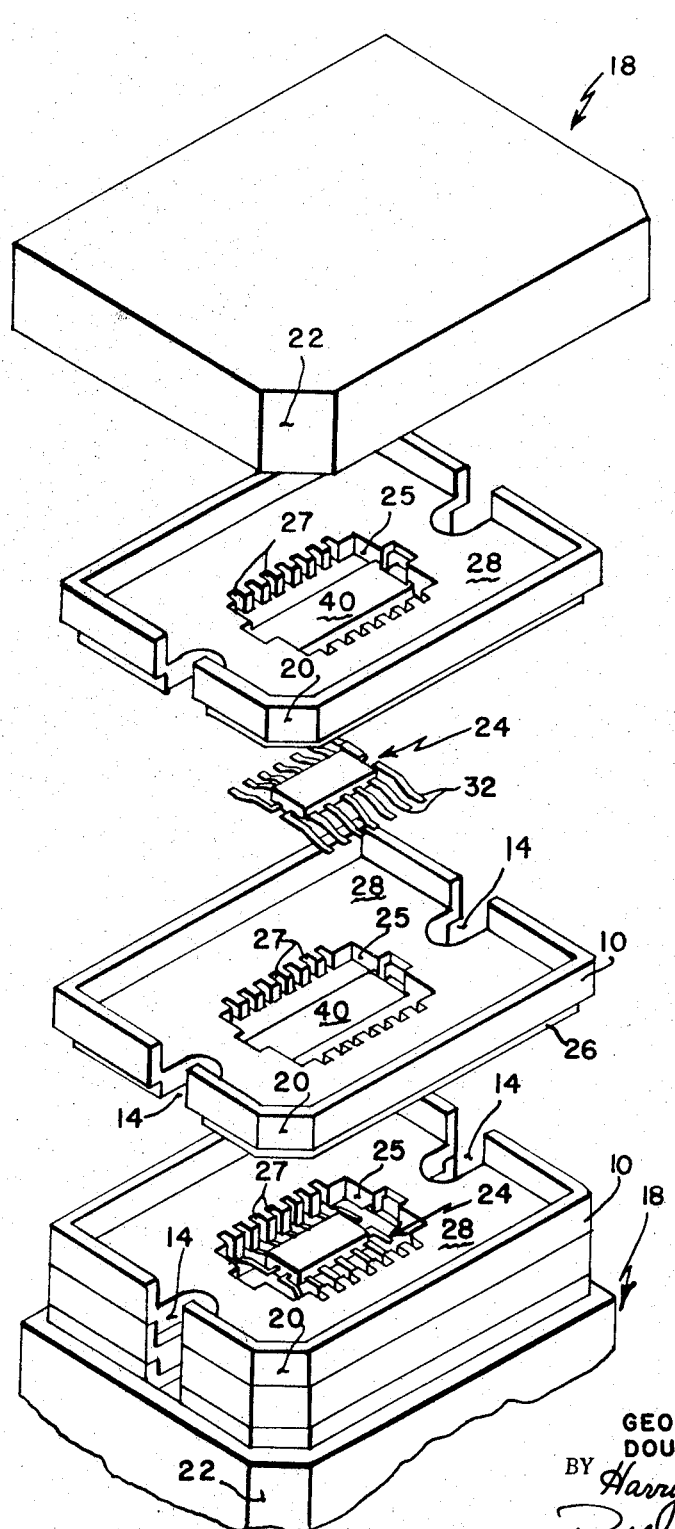
FIGURE 2 is an exploded view of a series stacked cartridges with a fragmentary showing of the container holding the stacked unit.

Referring more in detail to the drawing:

In FIGURE 1, a series of wafers, trays or cartridges 10 are shown confined in nested relationship by means of the wire clip 12. Each cartridge is formed with oppositely disposed recesses 14 which accommodate the prongs of the wire clip 12. A spring retainer 16 secures the nested unit, and as a unit it is inserted in a standardized covered package 18, see FIGURE 2, for transporting from supplier to user. A desiccant 15 may be provided when the assembly is to be enclosed in a container. The series of cartridges may be enclosed in a sealed plastic bag prior to its being placed in container 18.

Each cartridge is formed with a cut off corner 20, or with some other distinctive deformation, which conforms in a complementary manner to a similar deformation 22 on the package 18. This augments the rapid and accurate placement of the cartridges in the package—for transfer to an automated magazine system or for proper positioning for probe testing of the entire contents of the package in one probe operation.

Each tray or cartridge 10 functions as a protective carrier for the critical element 24 (FIGURE 2), which is later transferred as above noted, to its position on a circuit board. The trays 10 are formed with a central recessed portion 25, and slots 27 to accommodate and protect the fragile portions of the critical element. The recess 25 leaves a saddle portion 40 for support of the element. In addition shoulder 26 fits into a recessed floor 28 in the tray below for a nesting relationship.

The series of slots 27, extending through the floor 28 of each tray, accommodate, protect and accurately position the delicate leads 32 of the critical element 24.

In addition, each carrier 10 is designed to accommodate various sizes of I.C. elements with pre-cut and pre-formed leads. This is made possible by some sort of resilient element, formed on the under portion of each carrier or tray, to hold the fragile element in the tray below it, firmly in place.

Figure 3:
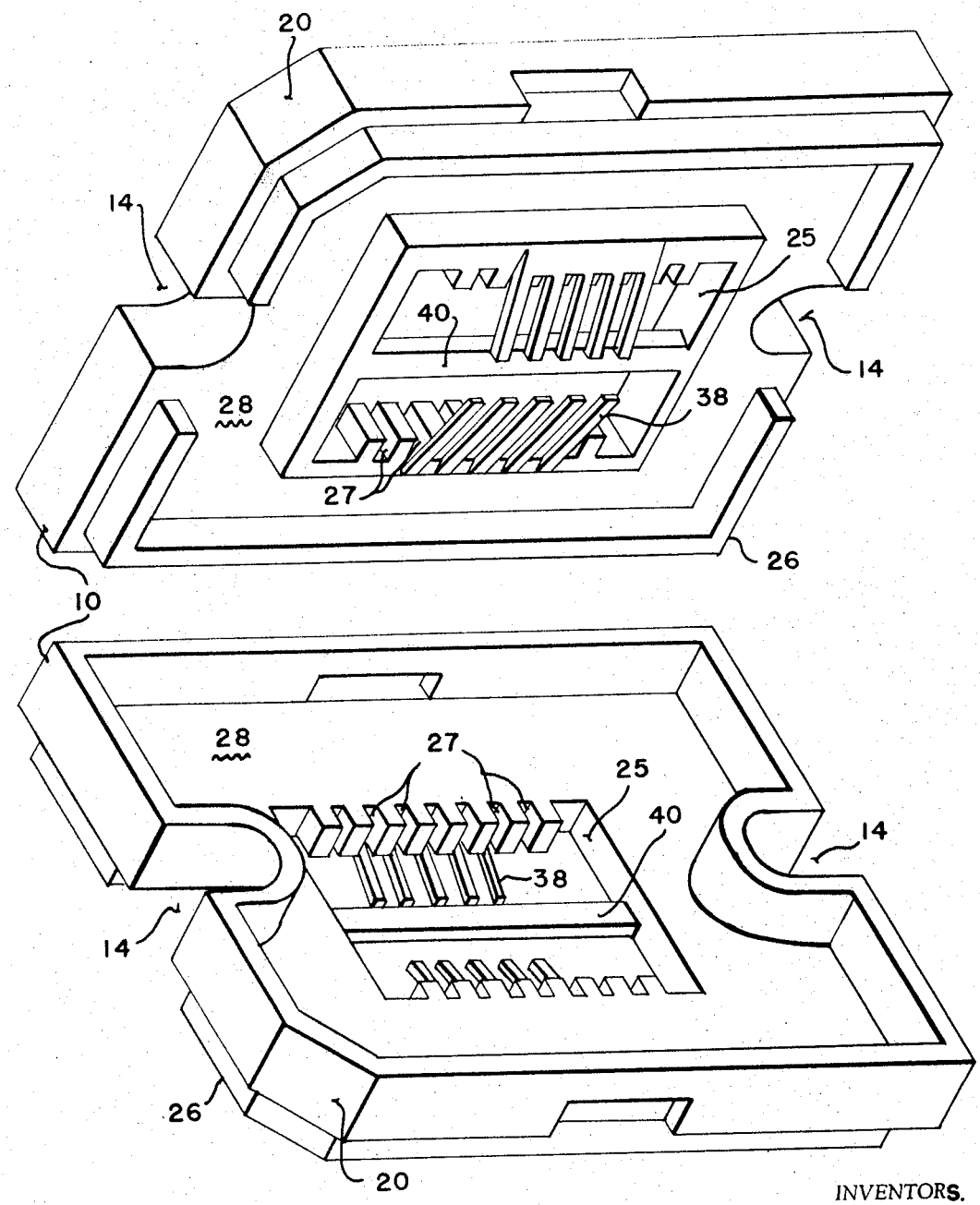
FIGURE 3 is a perspective view, much enlarged, of upper and under portions of cartridge trays, and showing a form of spring means within the cartridge for holding the critical elements accurately positioned.

In FIGURE 3, spring teeth 38 are illustrated to perform the function of biasing the I.C. element 24 on saddle 40.

Figure 4:
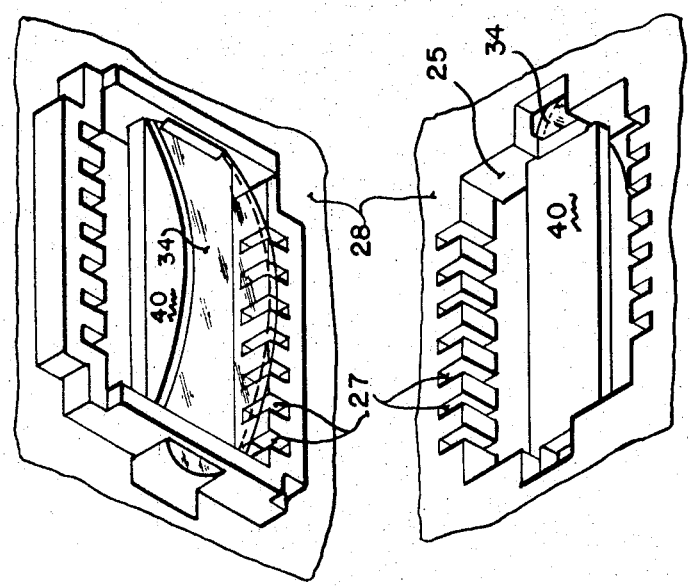

In FIGURE 4, a resilient plastic spring 34 serves this function. The strip 34, is for example, a die cut plastic polycarbonate strip, of thickness of the order of .005". This strip, assembled into the bottom of the carrier, acts as a spring hold down, and gently holds the critical element 24 on the carrier saddle 40 of the tray below. Pressure is exerted on the case of the component 24, rather than on the fragile leads. Lead and seal damage are thus prevented.

Figure 5:
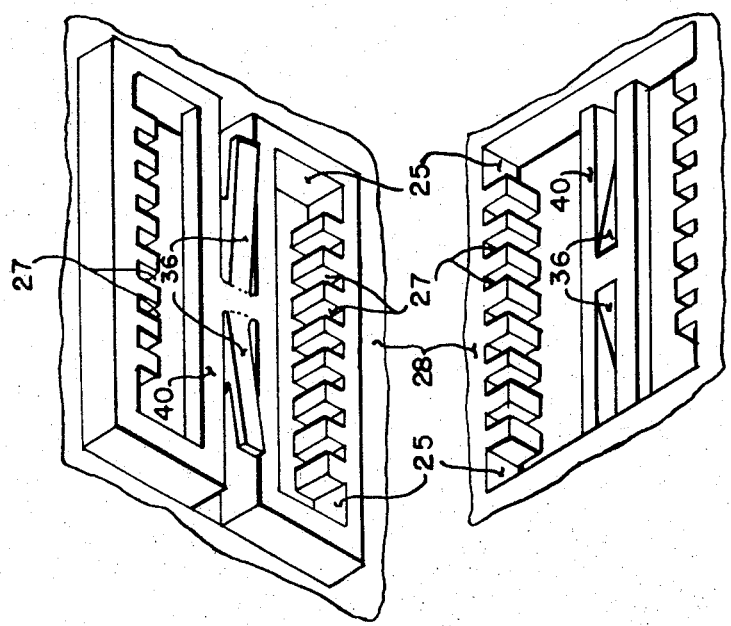
FIGURES 4 and 5 are fragmentary views, much enlarged, showing spring modifications.

In FIGURE 5, a pair of spring teeth 36 extend longitudinally and depend from saddle 40. In each of these examples, the holding springs exert gentle pressure and provide the necessary protection against damage, for the fragile elements.

The individual loaded elements may be tested by the supplier before being packed and shipped; or the whole stacked unit may be tested by miniature probes.

Figure 6:
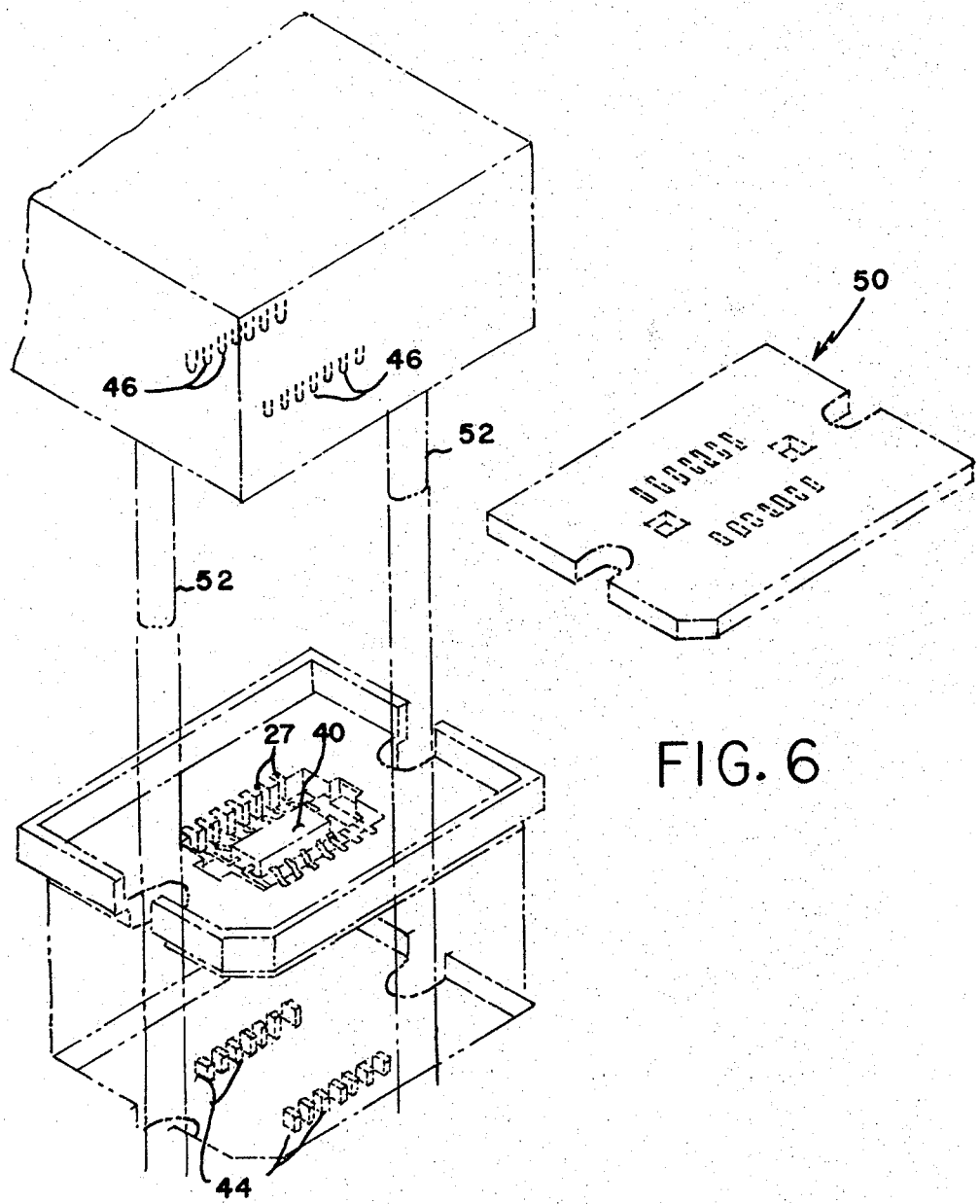
FIGURE 6 is a schematic showing of a test probe system.

FIGURE 6 is a schematic showing of a probe testing device.

The system is such that test probes 44 and 46 of a test unit can be positioned in any desired manner such as by means of guides 52 above and below an individual loaded cartridge as 10 in FIGURE 6 or modified to test a stacked series. A cover 50 may be used for protection of the critical elements during testing. Either set of probes may be resiliently mounted to float for accommodation in positioning.

I claim:

1. A standardized cartridge carrier for protection and transportation of critical and fragile components of integrated circuits, said carrier comprising a plurality of cartridge trays capable of being nested to fit into a container in nested relationship, recessed means in each cartridge tray sufficient in depth for accommodating and protecting a fragile integrated circuit component, means for holding said plurality of nested cartridges together as a unit so that they may be removed from a container as a unit and inserted as a unit into a magazine for automatic transfer of said elements to circuit boards, means for holding said trays together as a unit comprising a legged wire element of U-formation, an open U-shaped recess formed in opposite edges of each cartridge tray, the legs of said wire element entering said recesses at their open areas, and a spring clip engaging both legs of said wire element.

2. In a standardized cartridge carrier according to claim 1, a series of slots arranged in opposed pairs in the floor of each tray for accommodating the lead portions of said component, spring means located on the under portion of each of said cartridge trays for providing moderate pressure on the component located in the tray immediately below.

3. A device as claimed in claim 2 wherein said spring means comprises a curved resilient plastic strip.

4. A device as claimed in claim 2 wherein said spring means comprises a pair of oppositely directed and longitudinally oriented spring teeth.

5. A device as claimed in claim 2 wherein said spring means comprises a plurality of oppositely directed and laterally disposed spring teeth elements.

6. A device as defined in claim 1 including a container for surrounding said carrier.

References Cited

UNITED STATES PATENTS

| | | |
|---|---|---|
| 2,792,111 | 5/1957 | Ringler et al. |
| 2,826,333 | 3/1958 | Rodemich. |
| 2,987,198 | 6/1961 | Crane. |

JAMES B. MARBERT, *Primary Examiner.*